Nov. 22, 1960  R. J. BONDLEY  2,960,759
METHODS OF MANUFACTURING PHONOGRAPH STYLI
Filed Dec. 27, 1957
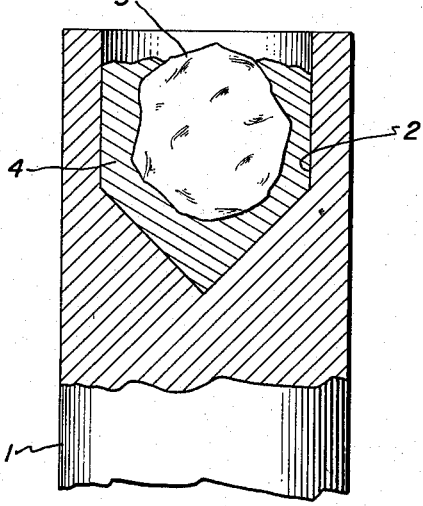
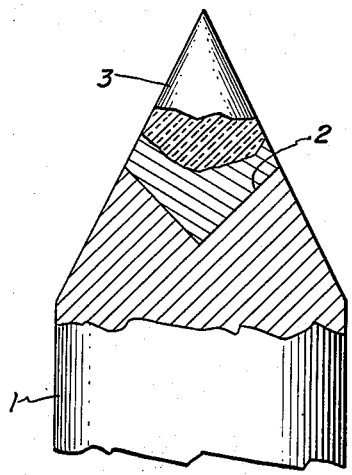
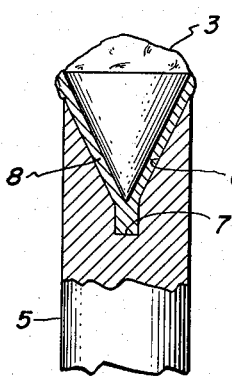
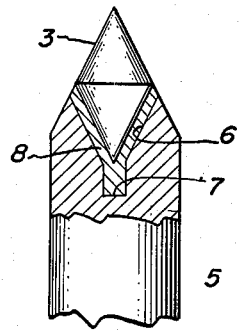
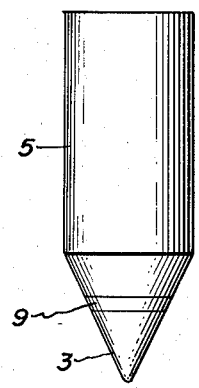
Inventor:
Ralph J. Bondley,
by Richard R. Brainard
His Attorney.

United States Patent Office 2,960,759
Patented Nov. 22, 1960

2,960,759
METHODS OF MANUFACTURING PHONOGRAPH STYLI

Ralph J. Bondley, Scotia, N.Y., assignor to General Electric Company, a corporation of New York Filed Dec. 27, 1957, Ser. No. 705,602

3 Claims. (Cl. 29—169.5)

The present invention relates to improved methods of manufacturing gem tipped phonograph styli.

All high quality phonograph styli are now gem-tipped and the trend toward diamond tipped styli has greatly increased. There has also been a great demand for light weight mountings and small styli. This has caused a substantial trend toward brazing or chemical bonding of the gem stone to the shank. While some diamonds are of regular shape, having the shape of an octahedron, small irregularly shaped diamonds are much cheaper and it would be desirable to make use of these diamonds in the manufacture of phonograph styli. In attempting to use irregularly shaped diamonds for styli in which the diamond is chemically bonded to the shank difficulties have been experienced in obtaining bonds of uniform strength and substantial shrinkage or manufacturing losses have occurred as a result of the non-uniformity of the bond strength and the resultant breakage during the final grinding of the exposed portion of the diamond.

Accordingly, it is an important object of the present invention to provide an improved method of mounting gem stones in the manufacture of gem-tipped styli.

It is a further object of the present invention to provide more uniform quality of gem-tipped styli utilizing gem stones of irregular shape.

Further objects and advantages of my invention will become apparent as the following description proceeds, reference being had to the accompanying drawing and its scope will be pointed out in the appended claims. In the drawing, Figures 1-4, inclusive, are elevational views partially in section showing a gem-tipped phonograph stylus in four stages of manufacture, and Figure 5 is an elevational view of a finished stylus made in accordance with my invention.

Referring now to Figure 1 a temporary holder or shank 1 in the form of rod stock of suitable metal such as iron or, perhaps, molybdenum, for example, is recessed from one end as shown at 2 and an irregularly shaped diamond 3 bonded within the recess by means of a suitable solder indicated at 4. While the particular bonding process employed is not important to the present invention, it is desirable that a bond of considerable strength be formed so that a subsequent grinding operation for shaping the diamond may be carried out without loosening the diamond from the holder. One such method, now employed for bonding diamonds to a shank, includes the steps of painting the diamond with a slurry of powdered titanium hydride in a fugitive binder and utilizing a granulated solder such as silver or silver-lead. The parts are then heated in a vacuum to melt the solder and then cooled to form the joint. Other known brazing processes may be employed.

Next the exposed portion of the diamond is shaped to a generally conical shape by a grinding or lapping operation in accordance with the practices now used for shaping the final exposed portion of the diamond. It will be apparent that this shaping of the diamond need not be carried to the same degree of smoothness as employed for the finished diamond tip. After this shaping has been carried out the assembly is heated to remove the diamond from the holder at which time the shaped portion of the diamond is mounted in the rod stock 5 which is to form the shank of the finished stylus. This provides a uniform shape and size for the portion of the diamond to be mounted and facilitates the subsequent mounting and grinding operations. As shown in Figure 3 the shank 5 may have a diameter in the order of .020 inch, for example. The end of the shank is recessed to receive the shaped diamond and since all of the diamonds have a finish to a similar size and shape it is possible to shape the recess in the shank correspondingly and provide, in this way, a more uniform condition for the bonding operation. As illustrated, the recess 6 is of generally conical shape and of substantially the same angle as the conical portion of the diamond. A counterbore 7 in the shank provides a small reservoir for the solder. As illustrated the entire conical surface of the diamond is wet by the solder layer 8. The exposed portion of the diamond is then ground to the shape and size desired for the finished stylus. This grinding is carried out on diamond lapping machines in accordance with processes now widely used in the manufacture of diamond tipped styli and the point ground and polished to a radius of approximately .001 inch. In Figure 5 the shank has been cut to the desired overall length which may be, for example, in the order of .070 inch. Thus, the finished stylus includes the shank, an exposed area of the solder 9 and the finished tip of the diamond 3.

The brazing or soldering process utilized for bonding the diamond to the shank 5 may be the same as that described in connection with the preliminary bonding of the rough stone to the holder 1 of Figure 1. The solders utilized may be selected in accordance with the temperatures that are attained during the grinding operation and in accordance with the metal used for the shank. Iron, iron-nickel alloys and beryllium-copper alloys have been used as shank materials. Pure silver solder may be employed and with such a solder the bonding is carried out at a temperature of about 960° C. in vacuum. A lower temperature solder having good ductility and tending to self-relieve stresses which are otherwise built into the bond as a result of the difference in thermal coefficients of expansion of the diamond and the shank include a 30% silver, 70% lead solder. With this solder the bonding temperature is in the order of 500° C. to 600° C. Other solders such as nickel may be employed if desired.

It is apparent from the foregoing description that the method of the present invention makes it possible to use the small cheap irregularly shaped diamonds or other gem stones or materials having good wearing properties and at the same time provide a uniformity of the mounting surface which permits a uniformity of the strength and size of the bond for a given stylus design. This permits good quality control, the use of inexpensive stones and a reduction in shrinkage during manufacture.

While I have described particular embodiments of my invention it will be apparent to those skilled in the art that changes and modifications may be made without departing from my invention in its broader aspects and I aim, therefore, in the appended claims to cover all such changes and modifications as fall within the true scope and spirit of my invention.

What I claim as new and desire to secure by Letters Patent of the United States is:

1. The method of manufacturing tipped styli including a shank and a piece of tip material which comprises, bonding an irregularly shaped piece of the tip material to a holder to provide a temporary mounting of the tip material on the holder, grinding the tip material to provide a substantial portion thereof with a predetermined shape, removing the piece of tip material from the holder, bonding the shaped portion of the tip material to a shank having a recess shaped similarly to the shaped portion of the tip by a permanent metallic bond between the piece of tip material and the walls of the recess and grinding a remaining portion of the tip to a conical shape.

2. The method of manufacturing gem-tipped styli including a shank and a tip of gem stone which comprises, bonding an irregularly shaped gem stone to a holder to provide a temporary mounting of the gem stone on the holder, grinding the gem to provide a substantial portion thereof with a predetermined shape, removing the gem stone from the holder, bonding the shaped portion of the gem stone to a shank having a recess shaped to receive the shaped portion of the gem stone by a permanent metallic bond between the gem stone and the walls of the recess and grinding a remaining portion of the gem stone to a conical shape.

3. The method of manufacturing diamond styli including a shank and a diamond tip which comprises, bonding an irregularly shaped diamond to a holder to provide a temporary mounting of the diamond on the holder, grinding the diamond to provide a substantial portion thereof with a conical shape, removing the diamond from the holder, bonding the shaped portion of the diamond to a shank having a conical recess receiving the shaped portion of the diamond by a permanent metallic bond between the diamond and the walls of the recess and grinding a remaining portion of the diamond to a conical shape.

References Cited in the file of this patent
UNITED STATES PATENTS

| | | |
|---|---|---|
| 1,138,354 | Catucci | May 4, 1915 |
| 1,456,687 | Edison | May 29, 1923 |
| 2,130,684 | Hintermeyer | Sept. 20, 1938 |
| 2,355,853 | Foxon | Aug. 15, 1944 |
| 2,641,879 | Dalrymple | June 16, 1953 |

FOREIGN PATENTS

| | | |
|---|---|---|
| 9,053 | Great Britain | Apr. 9, 1914 |